United States Patent [19]
Kreiensen et al.

[11] 3,755,907
[45] Sept. 4, 1973

[54] SYSTEM FOR DETERMINING THE TOLLERANCE VALUES OF THE FORM CURVE OF A CAM

[76] Inventors: Kurt Kreiensen, 773 Villingen, Konigsberger Str. 5a,; Karl Hutter, 722 Muhlhausen, Lerchenweg 195, both of Germany

[22] Filed: Oct. 23, 1970

[21] Appl. No.: 83,406

[52] U.S. Cl. ............... 33/174 L, 33/1 N, 33/172 E
[51] Int. Cl. ............................................. G01b 5/00
[58] Field of Search ..................... 33/174 L, 174 Q, 33/172 E, 1 N, 1 L

[56] References Cited
UNITED STATES PATENTS

| | | | |
|---|---|---|---|
| 3,400,463 | 9/1968 | Barringer | 33/174 L |
| 3,245,148 | 4/1966 | Whitney | 33/174 L |
| 3,593,133 | 7/1971 | Wisner | 33/174 Q |
| 3,234,655 | 2/1966 | Skeels et al. | 33/174 L |

*Primary Examiner*—William D. Martin, Jr.
*Attorney*—Molinare, Allegretti, Newitt & Witcoff

[57] ABSTRACT

The invention relates to a system for determining the tolerance values of the form curve of a cam, in which the cam is rotated and the actual cam vlaues are measured at each desired angular position. A device for determining the tolerance values of the form curve of a cam is mounted for rotation. On the cam an electrical transducer or caliper for linear measurements rests with its plunger.

10 Claims, 2 Drawing Figures

Patented Sept. 4, 1973 3,755,907

INVENTORS
KURT KREIENSEN
& KARL HUTTER
BY Molinare, Allegretti,
Newitt, & Witcoff
ATTORNEYS

SYSTEM FOR DETERMINING THE TOLLERANCE VALUES OF THE FORM CURVE OF A CAM

BACKGROUND OF THE INVENTION

For determining the permissible variation of a form curve of a cam it is common to rotate the cam around its fulcrum degree by degree and to measure the respective actual radial values of the cam in the various angular positions by means of an electrical transducer or caliper for linear measurements having a plunger pointing at the cam fulcrum and resting on the cam edge. The individual values measured are recorded on a diagram, if necessary, after having first been recorded in tables; then the reference curve is also recorded on the diagram so that the values of permissible variation are determined and a clear picture of the range of permissible variation in the individual angular positions is given. It is also common to include the tolerance values in the tables but in this case the table is lacing in clarity.

This common process has to be carried out by hand. It is therefore exceptionally time consuming and it requires intensive work. Careful measuring technicians have to operate the measuring device, and finally a complicated evaluation is necessary which is made on the basis of the tables or drawings. The time spent on these measurements and the efforts necessary for them are extremely great since the tolerance values might have to be determined several times for one cam because it is possible to reduce the tolerance values even by a slight displacement of the cam to a different angular position where the variations might lie within the permissible tolerance limits. Frequently, therefore, such exact measurements were avoided, which had its adverse effects either on the quality of the cams produced or on the amount of rejected products.

It is desirable to avoid the disadvantages of the common process, and in particular, to create a system which can carry out the determination of the tolerance values automatically and during a short period so that repeated measurements do not require an unacceptable waste of time.

SUMMARY OF THE INVENTION

This invention is generally related to a process for determining the tolerance values of the form curve of the cam including the steps of moving a recorder simultaneously with the rotation of the cam; the ideal reference radial values are stored on the recorder after being scanned; they are compared with the actual radial values in a comparator; at its end the tolerance values are displayed on the recorder.

This invention is also related to a device for determining the tolerance values of the form curve of a cam which is mounted for rotation and on which an electrical transducer or caliper for linear measurements rests with its plunger. A motor drives the cam. A storage instrument emits the reference value signals, moving together with the cam and feeding the respective reference value signals of the idealized form curve of the cam into a comparator instrument at every angular position, into which (instrument) is also fed the corresponding output voltage measuring signal of the electrical transducer or caliper for linear measurements, which represents the actual cam values. The difference between the actual radial value and the reference value appear on the recorder in this way.

The indicator of the reference values is essential for the success of the invention since this indicator contains the reference values for the various angular positions of the idealized cam. These reference values can be read with respect to various angular positions. The reference value indicator can, e.g. be a punched tape which moves along synchronously with the cam or which is switched step by step. Of course, other forms of reference value indicators can also be used, e.g. magnetic recorders. The reference value indicator can even be a strip of paper on which the reference value curve has been recorded and on which then the respective actual value curve is directly entered.

It is also possible to have a separate propelling unit for driving the reference value indicator, e.g. a step-by-step system which is activated by impulse signals that are generated by an impulse sender which in turn is moved by the rotation axis of the cam. This impulse sender produces, for example an impulse at every degree.

Because the electrical transducer or caliper for linear measurements also measures intermediary values between the recorded reference values while the cam is rotated at continuous velocity, it is advisable to provide a switch between the electrical transducer or caliper for linear measurements and the comparator in which the values are compared; the switch is closed by the pulses of the pulse sender, i.e. only when full degrees of the angle are passed so that a comparison and a determination of the tolerance values takes place only at these angular positions. Of course, the motor for rotating the cam can also be built in the form of a step-by-step system and the latter can be fed in the same way as the step-by-step system of the reference value indicator by joint step-by-step impulses so that intermediary values appear only during short periods at the electrical transducer or caliper for linear measurements and that relatively long periods of time are available for comparing the data and, thus, for determining the tolerance values.

It is advisable to arrange the reference value indicator with regard to the angular position of the cam in so that it can be adjusted. Thus, at the beginning of the measurements at least a rough agreement of the reference values and the actual values can be produced at the starting point of the measurements. By this adjustment, a position of the cam can be obtained with regard to the reference value indicator whereby the tolerance values are minimized and lie, if possible, within the acceptable range of variation.

BRIEF DESCRIPTION OF THE DRAWINGS

In the drawings examples of a preferred embodiment of the present invention are shown.

DETAILED DESCRIPTION OF THE PREFERRED EMBODIMENT

Figure 1:
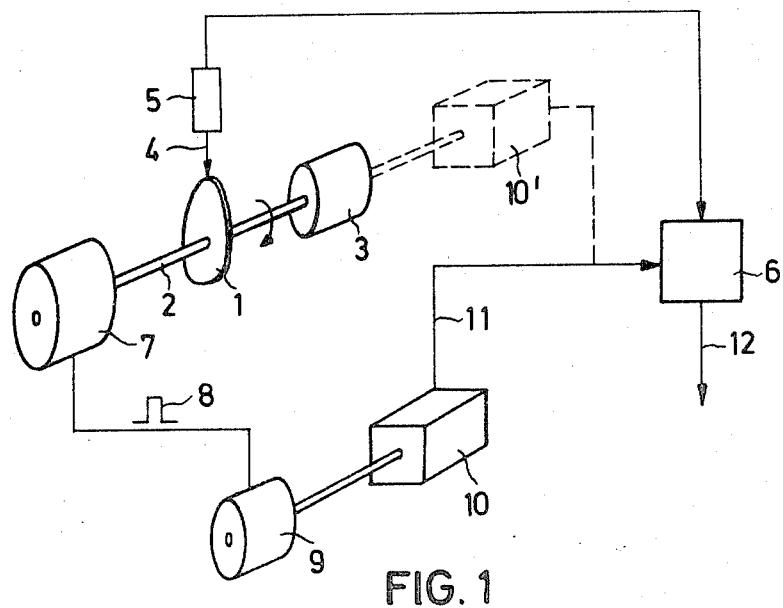
FIG. 1 describes a schematic for one type of construction which is made according to the invention.

The device according to FIG. 1 is used for determining the values of acceptable variation of a cam 1, which is held by an axis 2 in such a way that it may be rotated, and it is rotated by a motor 3. The radial reference values of cam 1 are scanned by a plunger 4 of an electrical transducer or caliper for linear measurements 5 whose electrical output measuring signals represent the actual values and are fed into a comparator 6 for comparing these values.

An impulse signal sender 7 is driven by the axis 2, also. The sender 7 feeds an impulse 8 into a step-by-step system 9 whenever a full degree of the angle is passed, and the system 9 switches one step forward when it receives an impulse 8 and also turns the reference value indicator 10 accordingly. Afterwards an electrical reference value signal appears at the outgoing circuit 11 and shows the reference value in the angular position that has just been scanned, and is then fed into the comparator 6.

Before the measurements are made the cam 1 is first adjusted roughly with regard to the position of the reference value recorder 10 (or vice versa) and the adjustment is made in such a way that the reference value and the actual value show a large degree of correspondence at a certain angular position. The adjustment might also be made exclusively with respect to the angular position. After this is completed, the motor 3, which can be a step-by-step motor, is put into operation so that the cam 1 is rotating away from under the plunger 4 and that the actual radial values are scanned by the plunger 4. When, for example, full degrees of the angle are passed, the impulse sender 7 emits an impulse signal each time these positions are passed and it thereby moves the step-by-step system 9 one step forward and, with it, also the reference value indicator 10, so that the comparator 6 in which the values are compared is always fed with the actual value measuring signals and the reference signals which are supplied by the reference value indicator 10 at full angular degrees.

The comparator 6 establishes the tolerance values from the data by computing the differences between them; and then this value of permissible vairation appears at the outgoing circuit 12. These tolerance values can either be read on a measuring instrument or can directly be recorded by a recorder, for example, on paper. It is advisable to synchronize the advance system for the paper with the rotation of the cam 1. This may be accomplished by a second step-by-step motor (not shown) which is also fed by the impulse 8.

By displacing the zone of permissible variation along the angular axis, it might be possible to place a cam 1 whose values fall outside the field of permissible variation in the angular positions which were measured, into the field of acceptable tolerance values. In reality, this means that a cam 1 which would be characterized as scrap material on the basis of one set of measurements that were carried out can be saved from being so characterized by displacing the direction of the cam 1.

As an alternative embodiment to that shown in FIG. 1, it is possible to omit the pulse sender 7 and the step-by-step system 9 if the reference value indicator 10 is directly driven. The value indicator 10', shown by broken lines is directly driven by motor 3. In this case the motor 3 should preferably be a step-by-step motor and the reference value indicator 10' must, of course, lie in the range of the mechanical measuring instruments while it can be placed at a distance from them, for instance together with the printer, in an arrangement which is shown by the unbroken lines.

Figure 2:
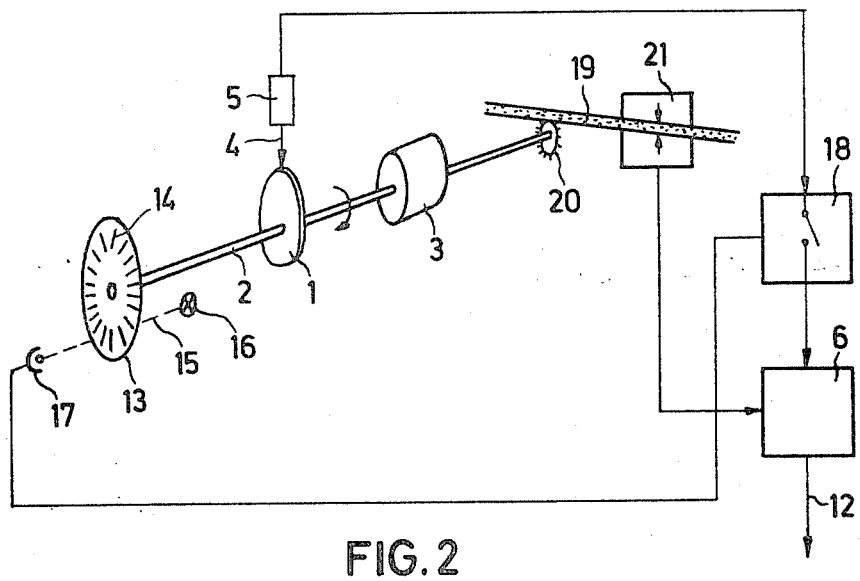
FIG. 2 describes a modified version of the type of construction shown in FIG. 1 having parts which are identical to those in FIG. 1 numbered by the same symbols.

The arrangement as shown in FIG. 2 corresponds to a large degree to that given in FIG. 1 and corresponding parts are numbered by the same symbols in both drawings.

According to FIG. 2, the impulse sender 7 consists of a slit diaphragm 13, which basically consists of an opaque disc that is mounted on the axis 2 and is provided with slits 14. Through these slits 14, rays 15 from a light source 16 can fall on a photocell 17. The slits 14 are always provided in those angular positions in which measurements are to be made. If the light ray 15 falls through one of the slits 14, the photocell 17 sends an impulse signal if necessary after amplifying it. This impulse closes a switch which, thus, conducts the measuring signals of the electrical transducer or caliper 5 for linear measurements to the compartor 6. In this way the tolerance values are determined only when full degrees of the angle are passed. It should be understood from the foregoing that the photocell arrangement of the impulse sender 7 may be employed to drive the step-by-step system 9 of FIG. 1.

In the example given in FIG. 2, the reference value indicator 10 is a punched tape instrument comprising a punched tape 19, on which the reference values are recorded in punched code. Of course, other recorders can also be used. The punched tape 19 is driven by a toothed wheel 20, which in this case is connected to the motor 3. It might also be advisable to have a separate step-by-step system (not shown) as a propellent unit for the toothed wheel 20. Such a separate system (not shown) can be switched forward by the impulses of the photocell 17. The reference values recorded on the punched tape 19 are scanned by the scanning instrument 21 and are fed to the comparator 6 in the form of electrical signals; in the comparator 6 the tolerance values are then determined in the manner previously described.

What is claimed is:

1. Apparatus for determining the tolerance values of the form curve of a cam comprising, in combination;
    means for rotating the cam about a fulcrum of said cam,
    means for generating measuring signals representative of the form curve of said cam as said cam is rotated,
    means for emitting predetermined stored reference signals representative of the form curve of a desired, ideal cam,
    means for generating tolerance signals representative of the difference between the measuring signals and the reference signals, and
    means for displaying the tolerance signals whereby the tolerance values of said cam may be determined.

2. The apparatus as set forth in claim 1 wherein said rotating means comprises an electrical motor.

3. The apparatus as set forth in claim 1 wherein said measuring signal generating means comprises an electrical caliper having a plunger directed toward the fulcrum of said cam and adapted to contact the edge of said cam as said cam is rotated.

4. The apparatus as set forth in claim 1 wherein said reference signal emitting means comprises means connected to said motor for generating impulse signals having a frequency related to the speed of rotation of said motor and means having said reference signals stored therein responsive to said impulse signals for discretely emitting said reference signals in sequence with said impulse signals.

5. The apparatus as set forth in claim 1 wherein said display means comprises a recorder having an input connected to the output of said tolerance signal generating means.

6. The combination as set forth in claim 4 wherein said impulse signal generating means comprises a disc having slits defined thereon, said disc connected to said motor for rotation, a light source positioned on one side of said disc and a photocell positioned on the other side of said disc and adapted to conduct an impulse signal whenever light from said source passes through one of the slits on said disc and impinges on said photocell.

7. The apparatus as set forth in claim 1 wherein said cam rotating means comprises a motor drivingly connected to the fulcrum of said cam and adapted to rotate said cam in discrete angular movements.

8. The apparatus as set forth in claim 7 wherein said reference signal emitting means is drivingly connected to said motor and adapted to emit reference signals sequentially in response to the discrete angular movement of said cam.

9. The apparatus as set forth in claim 1 wherein said means for emitting stored reference signals comprises a tape having information representative of the reference signals, a means for converting the information stored in said holes to reference signals as said tape moves thereby and means for drivingly connecting said tape to said motor.

10. The apparatus as set forth in claim 1 including a means connected to said cam rotating means to generate impulse signals having a frequency related to the speed of rotation of said cam, and switch means responsive to said impulse signals for conducting the measuring signals to said tolerance signal generating means synchronously with said impulse signals.

* * * * *